(12) United States Patent
Procyshyn et al.

(10) Patent No.: US 10,788,264 B2
(45) Date of Patent: Sep. 29, 2020

(54) METHOD AND APPARATUS FOR LOADING A LYOPHILIZATION SYSTEM

(71) Applicants: Christopher Procyshyn, Surrey (CA); John Senger, Surrey (CA); Juvenal Naing, North Vancouver (CA)

(72) Inventors: Christopher Procyshyn, Surrey (CA); John Senger, Surrey (CA); Juvenal Naing, North Vancouver (CA)

(73) Assignee: VANRX PHARMASYSTEMS, INC., Burnaby (CA)

( * ) Notice: Subject to any disclaimer, the term of this patent is extended or adjusted under 35 U.S.C. 154(b) by 388 days.

(21) Appl. No.: 15/097,254

(22) Filed: Apr. 12, 2016

(65) Prior Publication Data
US 2017/0291774 A1    Oct. 12, 2017

(51) Int. Cl.
| | |
|---|---|
| *F26B 5/06* | (2006.01) |
| *F26B 9/06* | (2006.01) |
| *A61J 3/00* | (2006.01) |
| *F26B 25/00* | (2006.01) |

(52) U.S. Cl.
CPC .............. *F26B 9/066* (2013.01); *A61J 3/00* (2013.01); *F26B 5/06* (2013.01); *F26B 25/003* (2013.01); *A61J 2200/44* (2013.01)

(58) Field of Classification Search
CPC ... B25J 17/00; B25J 17/02; B25J 18/00; B25J 18/007; B25J 18/02; B25J 18/04; F26B 25/001; F26B 25/003; F26B 25/02; F26B 25/063

USPC ............... 34/284, 296, 297, 105; 74/490.01, 74/490.02, 490.03, 490.04, 490.05, 74/490.06

See application file for complete search history.

(56) References Cited

U.S. PATENT DOCUMENTS

| | | | | |
|---|---|---|---|---|
| 2006/0263179 | A1* | 11/2006 | Selch ................... | B65G 1/0435 414/222.01 |
| 2010/0281823 | A1* | 11/2010 | Stahl ...................... | B65B 23/14 53/154 |
| 2013/0014605 | A1* | 1/2013 | Caveney ................. | B25J 18/04 74/490.03 |
| 2014/0196411 | A1* | 7/2014 | Procyshyn .............. | B25J 21/02 53/467 |

(Continued)

*Primary Examiner* — John P McCormack
(74) *Attorney, Agent, or Firm* — Kevin R. Erdman; Brannon Sowers & Cracraft PC

(57) ABSTRACT

Disclosed are systems and methods for aseptically filling pharmaceutical containers with a pharmaceutical substance and then lyophilizing it. In one general aspect, the system and method can employ a lyophilizer loader subsystem having an interior chamber in communication with an interior chamber of a lyophilizer subsystem via a portal with a sealable door, with the collective interior being aseptically sealable. An articulated robotic arm can be employed to batch transfer to the lyophilizer subsystem container nests bearing the pharmaceutical containers. In one embodiment, the nests may be transferred serially to the loader subsystem, with the articulated robotic arm being configured to transfer the nests of containers in batches to the lyophilizer subsystem. The articulated robotic arm can also be configured to be used to move batches of nests within the lyophilizer subsystem. One implementation includes two articulated arms and a joint rotary wrist driven by two rotary shoulders.

6 Claims, 6 Drawing Sheets

(56) References Cited

U.S. PATENT DOCUMENTS

2014/0271083 A1* 9/2014 Caveney ............ H01L 21/67173
   414/749.5
2015/0089830 A1* 4/2015 Wissner .................... F26B 5/06
   34/284

\* cited by examiner

METHOD AND APPARATUS FOR LOADING A LYOPHILIZATION SYSTEM

BACKGROUND OF THE INVENTION

Field of the Invention

The invention relates to methods and systems for loading pharmaceutical containers into a lyophilization system.

Description of the Related Art

Lyophilization, also referred to as freeze-drying, is employed in the field of medical technology to increase the shelf life of products such as vaccines and other injectables. By removing the water from the material and sealing the material in a vial or other container, the material can be easily stored, shipped, and later reconstituted to its original form for injection. Lyophilization is also employed to produce tablets or wafers, the advantage of which is less excipient as well as a rapidly absorbed and easily administered dosage form.

In prior art pharmaceutical container loading arrangements, the pharmaceutical containers are typically loaded sequentially into the lyophilizer. To this end, conveyor belt systems are often employed, and the containers are entrained one behind the other for transfer to the lyophilizer.

SUMMARY OF THE INVENTION

In a first aspect, an integrated pharmaceutical processing system is presented comprising: a lyophilizing subsystem configured to lyophilize a pharmaceutical substance and having a lyophilizer interior chamber sealable from an ambient environment and a supply portal with a sealable door; and a lyophilizer loading subsystem having a loader interior chamber sealable from the ambient environment and in communication with the lyophilizer interior via the supply portal, the loading subsystem comprising within the loader interior chamber: a multi-nest support mechanism that includes a plurality of support structures that are each constructed to support one of a plurality of multi-container nests, and having a range of motion that extends between a nest loading station and a first location in the lyophilizer interior chamber, and a drive mechanism operatively connected to the multi-nest support mechanism and operative to drive the multi-nest support mechanism between the loading station and the first location in the lyophilizer interior chamber.

The multi-nest support mechanism may be configured to receive the plurality of container nests in series before transferring them in parallel. The multi-nest support mechanism may comprise an articulated robotic arm configured to engage simultaneously with the plurality of container nests and to place them via the supply portal at a first location in the lyophilizer interior chamber. The articulated robotic arm may be configured to move the plurality of container nests from the first location to a second location in the lyophilizer interior chamber. The articulated robotic arm may comprise a rotary end effector disposed at a distal end of the arm, wherein the rotary end effector includes the multi-nest support mechanism on a first side and a pushing surface on a second side.

The articulated robotic arm may further comprise a plurality of rotary joints all configured to rotate about parallel vertical rotary axes. The articulated robotic arm may further comprise two rotary shoulders disposed at a proximal end of the articulated robotic arm, two rotary elbows, and a joint rotary wrist disposed at a distal end of the articulated robotic arm, wherein articulation of the arm is driven by the two rotary shoulders. The articulated robotic arm may be configured to allow the joint rotary wrist to pass between the rotary elbows to a position proximate a nest access location within the loader interior chamber.

The system may further comprise a pharmaceutical filling subsystem having a filling system interior chamber sealable from the ambient environment and comprising a filling station within the filling system interior chamber configured to fill with the pharmaceutical compound pharmaceutical containers held in the container nests. The system may further comprise an accumulator subsystem having an accumulator interior chamber sealable from the ambient environment and in communication with the loader interior chamber and the filling system interior chamber, the accumulator subsystem being configured to accumulate within the accumulator interior chamber from the filling subsystem container nests bearing containers at least partially filled with the pharmaceutical compound and to make the container nests available to the lyophilizer loading subsystem.

In a further aspect, a method is presented for aseptically processing a pharmaceutical substance, the method comprising: at least partially filling with the pharmaceutical substance under an aseptic condition within a sealed processing chamber a plurality of containers held in each of a plurality of container nests; batch transferring to a lyophilizer a plurality of the container nests bearing containers containing the pharmaceutical substance, and operating the lyophilizer to lyophilize the pharmaceutical substance.

The method may further include sealing an interior chamber of the integrated pharmaceutical processing system against an external environment; establishing in the interior chamber of the pharmaceutical processing system an aseptic condition before the step of at least partially filling; and wherein the step of batch transferring includes batch relocating the plurality of container nests with their pharmaceutical containers to an interior chamber of the lyophilizer without unsealing the integrated pharmaceutical processing system; and sealing an interior chamber of the lyophilizer from a remainder of the integrated pharmaceutical processing system before the step of operating the lyophilizer. The relocating may comprise operating an articulated robotic arm to engage with the plurality of container nests; and operating the articulated robotic arm to place the plurality of container nests at a first location in the interior chamber of the lyophilizer.

The method may further comprise operating the articulated robotic arm to move the plurality of nests from the first location in the interior chamber of the lyophilizer to a second location in the interior chamber of the lyophilizer. The method may further comprise serially transferring within the processing system from the filling station to an interior chamber of an accumulator subsystem a plurality of container nests bearing containers containing the pharmaceutical substance; and serially transferring within the interior chamber of processing system the plurality of nests from the interior chamber of the accumulator subsystem to a nest access location in an interior chamber of a lyophilizer loading subsystem. The steps of filling and batch transferring may operate simultaneously on different container nests.

In a further aspect, an integrated pharmaceutical processing system is presented comprising an actuator assembly including: a housing having first and second shaft openings; at least one rotary actuator held in the housing; a first output shaft that passes through the first shaft opening in the housing, has a first end responsive to the at least one rotary actuator inside the housing, and has a second end outside the housing; a second output shaft located proximate that first output shaft, wherein the second output shaft passes through the second shaft opening in the housing, has a first end responsive to the at least one rotary actuator inside the housing, and has a second end outside the housing; a first upper arm having a first end connected to the second end of the first shaft and a having a second end so that it is at least generally perpendicular to an axis of rotation of the first shaft; a second upper arm having a first end connected to the second end of the second shaft and having a second end so that it is at least generally perpendicular to an axis of rotation of the second shaft; a first forearm having a first end and a second end; a second forearm having a first end and a second end; a first articulation between the second end of the first upper arm and the first end of the first forearm; a second articulation between the second end of the second upper arm and the first end of the second forearm; a wrist member including: an articulation mount having an axis of rotation; at least one nest support structure to support a multi-container nest on one side of the axis of rotation of the articulation mount; a pushing surface located opposite the axis of rotation of the articulation mount from the nest support structure and is at least generally parallel to the axis of rotation of the articulation mount; a third articulation between the second end of the first forearm and the second end of the second forearm, wherein the axes of rotation of the first and second output shafts, and the axes of the first, second, and third articulations are at least generally parallel to define a five-bar linkage, and a rotary wrist actuator between the third articulation and the wrist member articulation mount.

The housing, housing openings, wrist actuator, and the first, second, and third articulations may all be sealed. The nest support structure may be a multi-nest support mechanism of support structures that are each constructed to support one of a plurality of multi-container nests. The integrated pharmaceutical processing system may be a lyophilizer loading system. The first and second forearms may be offset with respect to each other in the direction of the axes of rotation to allow them to pass next to each other and above the first and second output shafts. The apparatus may further include a lifting actuator operatively connected to the first and second output shafts to lift the nests during transfers.

Systems according to the invention can have the advantage that they load container nests in parallel instead of in series. This can help prevent issues that can occur in prior art systems in which an entrainment error of a single container can halt the lyophilization process, or at least require intervention in some way or other. This can fundamentally improve the throughput of the system and thereby the costs associated with the process. At the root of this matter lies the fact that such prior art solutions can be fundamentally serial systems.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
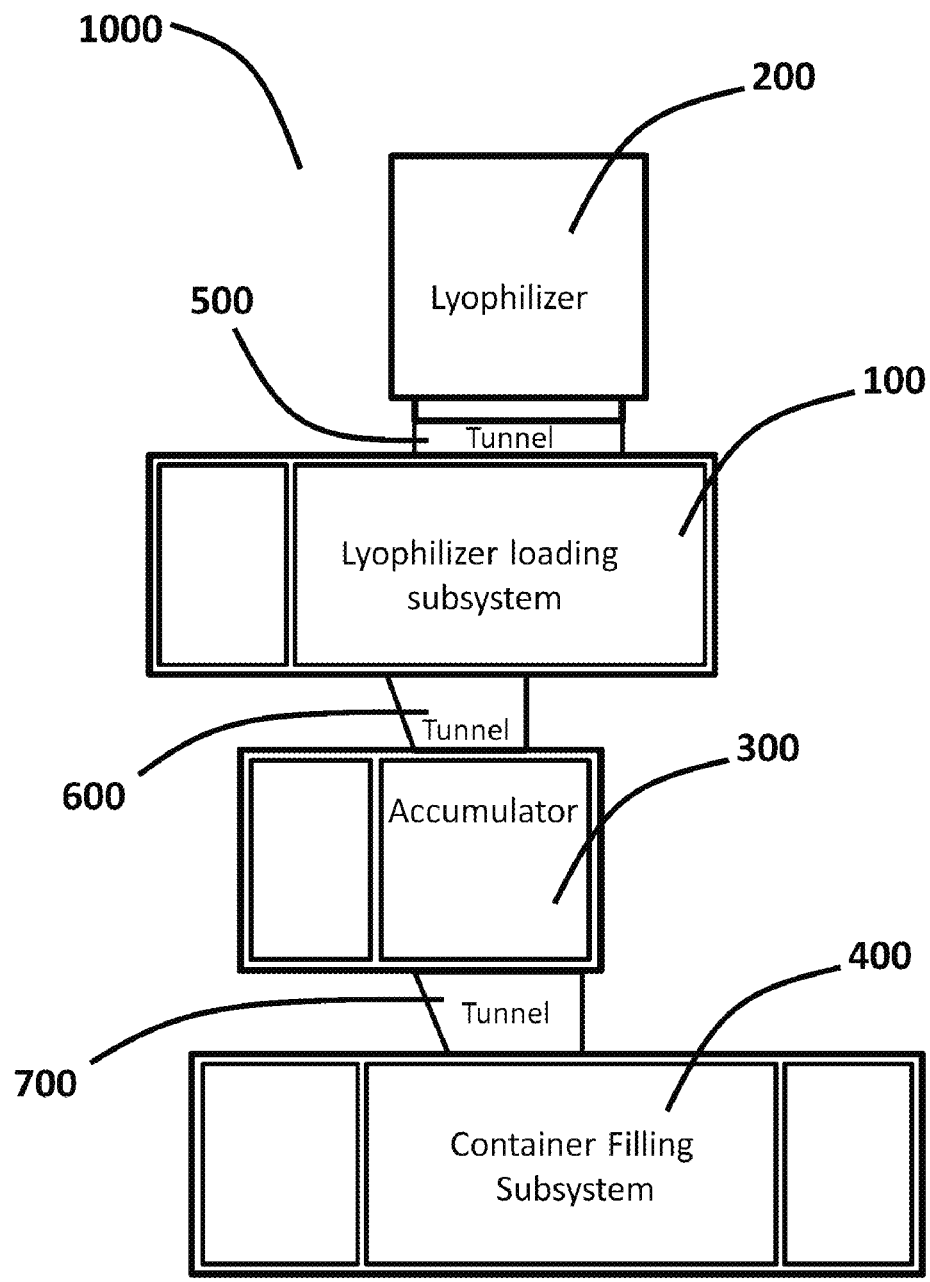
FIG. 1 is a plan view schematic diagram of a system for filing pharmaceutical containers with a pharmaceutical material, accumulating the filled containers, and loading the filled containers into a lyophilization system.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

The present invention relates to a system and method for filing pharmaceutical containers with a pharmaceutical substance or other material to be lyophilized, accumulating the filled containers, and loading the filled containers into a lyophilization system. Whereas prior art systems typically serially entrain the containers and then transfer them one at a time serially to the lyophilizer, the present specification will describe below a system and method for handling the containers within nests which allow the several containers within the nests to be transferred simultaneously. At least one arrangement for such simultaneous transfer will be described, based on an articulated robotic arm system. As will be shown, the system allows for a plurality of nests of containers to be transferred simultaneously to the lyophilizer.

In the present specification, the term "pharmaceutical substance" is used to describe materials of organic or inorganic nature employed in the medical field.

FIG. 1 shows a plan view schematic diagram of a pharmaceutical processing system 1000 for filing pharmaceutical containers with a pharmaceutical material, accumulating the filled containers, and loading the filled containers into a lyophilization system. System 1000 comprises a pharmaceutical container loading subsystem 100, a lyophilizer subsystem 200, an accumulator subsystem 300, and a pharmaceutical container filling subsystem 400. Tunnels 500, 600, and 700 join respectively the lyophilizer subsystem 200 to the loading subsystem 100, the loading subsystem 100 to the accumulator subsystem 300, and the accumulator subsystem 300 to the filling subsystem 400. An environmental condition is established in loading subsystem 100 and is maintained by means of the tunnels 500, 600, and 700 throughout accumulator subsystem 300 and loading subsystem 100. Since lyophilizer subsystem 200 has to maintain a unique environmental condition different from that in the rest of system 1000, lyophilizer subsystem 200 may be sealed off from the rest of system 1000 by means of a suitable door, as shown later in FIG. 4. Tunnel 500 nevertheless maintains the environmental condition of the rest of the system up to that door.

Figure 2:
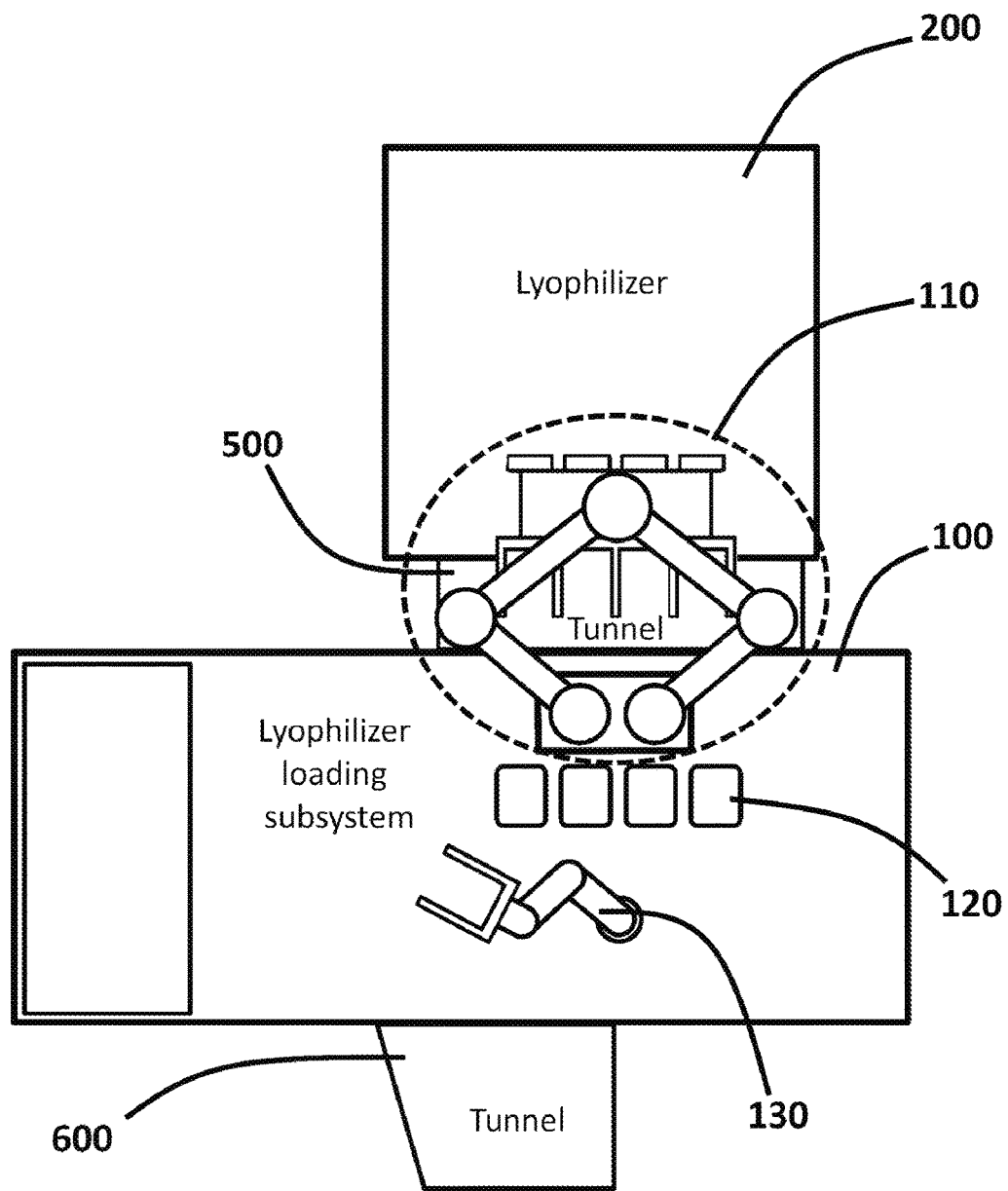
FIG. 2 is a more detailed plan view of the loading subsystem and lyophilizer subsystem of FIG. 1.

FIG. 2 shows a more detailed plan view of tunnel 600, loader subsystem 100, tunnel 500, and lyophilizer subsystem 200. Loader subsystem 100 comprises articulated robotic arm subsystem 110 for batch transferring container bearing nests into lyophilizer subsystem 200 through tunnel 500, at least one container nest pedestal 120 (four are shown in FIG. 2), and a transfer articulated robotic arm 130 for transferring container nests 800 serially from a source location in tunnel 600 to the at least one container nest pedestal 120. In the present specification, we use the term "container nest access location" to describe a generalized location from which the robotic arm 130 may access a plurality of container nests 800, including for example without limitation the set of pedestals 120. The arrangement shown in FIG. 2 allows for the serial transfer of container nests 800 from accumulator subsystem 300 to lyophilizer loader subsystem 100, articulated robotic arm 130 being configured for serially transferring container nests 800. In other embodiments, a different means may be employed for the transfer of container nests 800 from accumulator subsystem 300 to lyophilizer loader subsystem 100, and such arrangements may allow the batch transfer of container nests 800. Other arrangements for container nest access locations may be employed. Articulated robotic arm subsystem 110 is disposed to engage with one or more container bearing nests on the at least one container nest pedestal 120 and to transfer the nests to the lyophilizer subsystem 200.

The term "batch relocating" or "batch transferring" is used in this specification to refer to a number of items, typically identical or similar, for example container nests 800, being relocated or transferred simultaneously or "in parallel". In this respect the process is distinguished from a process in which the same items are being "serially relocated" or "serially transferred". In the latter case the items are relocated or transferred one at a time. The present invention comprises subsystems having means arranged for batch transfer of container nests, while other means are arranged for serial transfer. A means arranged for batch transfer can serially transfer individual container nests. However, means arranged for serial transfer of container nests cannot batch transfer pluralities of container nests.

Figure 3:
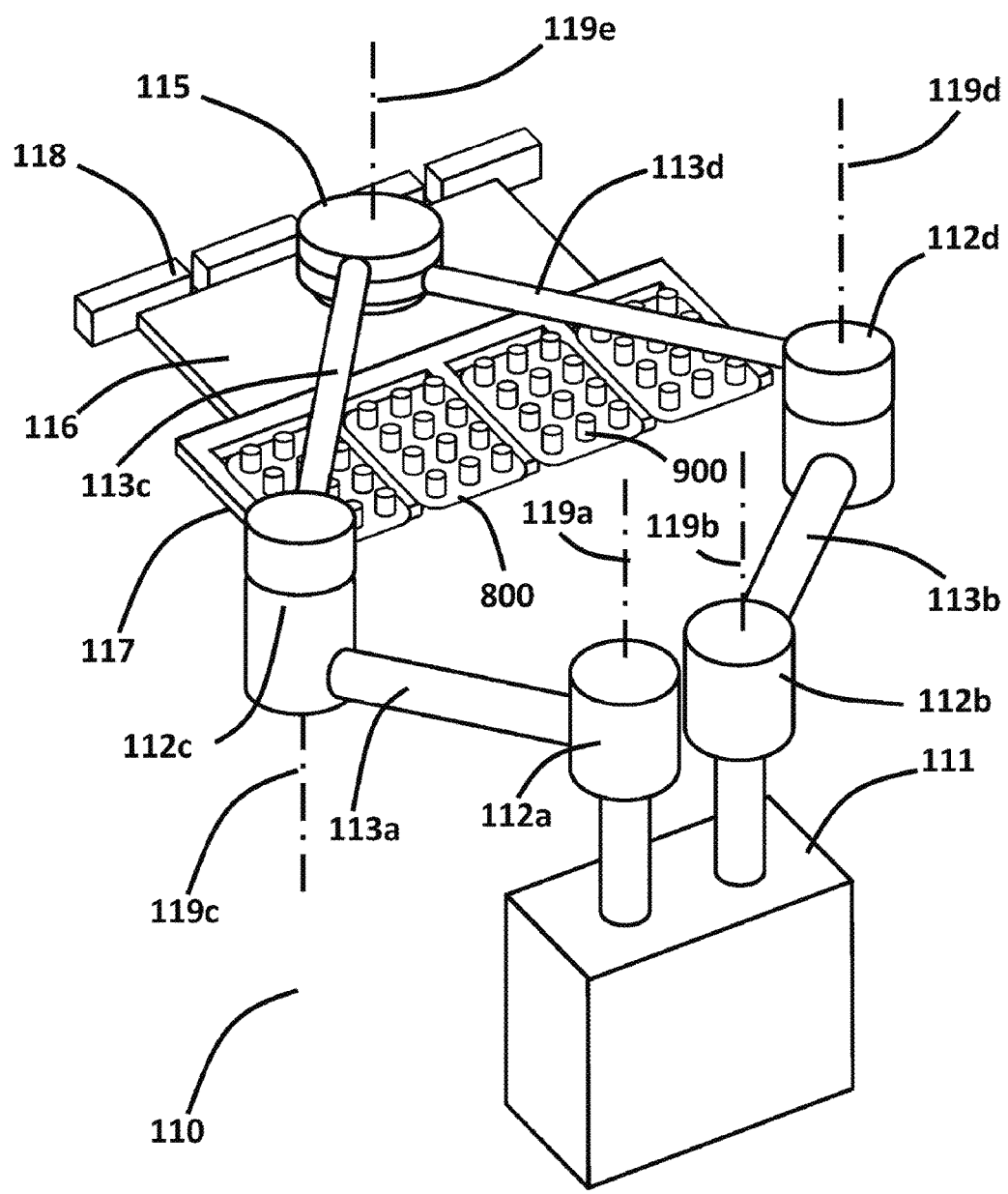
FIG. 3 is an isometric view of an articulated robotic loading arm subsystem of the loading subsystem of FIG. 3.

FIG. 3 shows articulated robotic arm subsystem 110 in more detail. Following the terminology suggested by the parallels with the human anatomy of shoulders, upper arms, forearms and joined or tied wrists, the articulating elements of the robotic arm subsystem 110 are left and right upper arms 113a and 113b, and left and right forearms 113c and 113d. Rotary elbows 112c and 112d join the left forearm 113c to the left upper arm 113a, and the right forearm 113d to the right upper arm 113b respectively. Actuator assembly 111, disposed at a proximal end of robotic arm subsystem 110, provides both the rotary action and the vertical motion of left rotary shoulder 112a and right rotary shoulder 112b. Forearms 113c and 113d are joined at rotary wrist 115 that allows forearms 113c and 113d to articulate with respect to each other. Rotary elbows 112c and 112d may be unpowered, all required power for the articulation being provided by actuator assembly 111. The articulation of robotic arm subsystem 110 is therefore driven only at the proximal or shoulder end of robotic arm subsystem 110.

The actuator assembly 111 can be implemented with left and right rotary actuators that respectively drive the output shafts that drive the shoulders, or with a single actuator and a suitable rotary mechanism to drive the output shafts in opposite directions (e.g., a gearbox). The actuator assembly 111 is preferably enclosed in a housing to isolate the actuators from the inside of the loading subsystem 100. The actuator assembly may also include one or more linear actuators to lift the output shafts, allowing the nests to be lifted and set down by the robotic arm subsystem 110.

Rotary shoulders 112a and 112b rotate about shoulder rotational axes 119a and 119b respectively. Rotary elbows 112c and 112d rotate about elbow rotational axes 119c and 119d respectively. Rotary wrist 115, located at the distal end of robotic arm subsystem 110, rotates about wrist rotational axis 119e. Rotary wrist 115 further allows fork-and-pusher baseplate 116 to rotate about rotary axis 119e. To this end rotary wrist 115 is equipped with a suitable drive (not shown) to rotate baseplate 116. Suitable drives may be, for example without limitation, a worm drive.

Robotic arm subsystem 110 is capable of rotating the forearms 113c and 133d "inward" to extend further in the proximal direction than the shoulders 112a and 112b. This allows robotic arm subsystem 110 to move fork-and-pusher baseplate 116 to container nest pedestal 120 of FIG. 2 and FIG. 4, allowing fork-and-pusher baseplate 116 to pass between rotary elbows 112c and 112d and over rotary shoulders 112a and 112b in that process. The vertical extent of the rotary elbows 112c and 112d makes this articulation possible.

Figure 4:
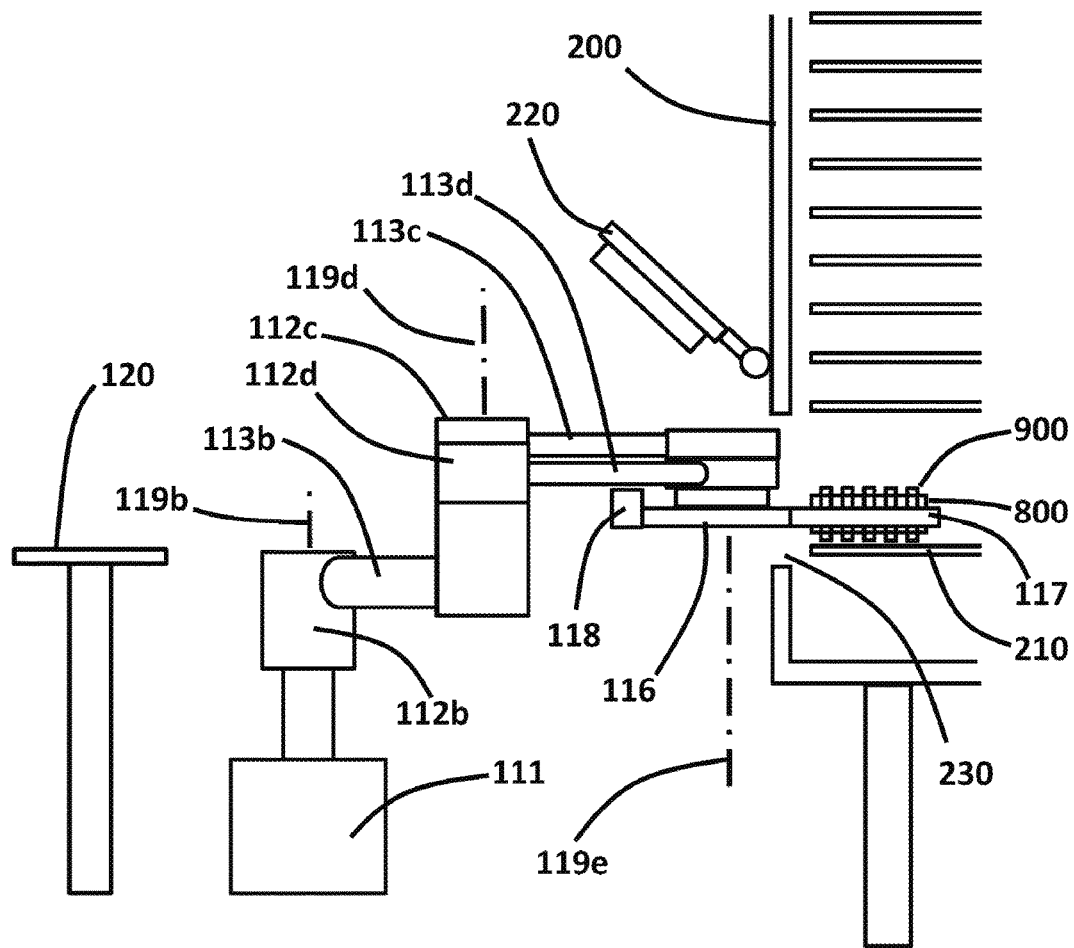
FIG. 4 is a side view of the articulated robotic loading arm subsystem of FIGS. 2 and 3, and lyophilizer subsystem of FIG. 1.

When left and right rotary shoulders 112a and 112b are rotated respectively anti-clockwise and clockwise (looking down on actuator assembly 111), rotary elbows 112c and 112d separate further from each other and rotary wrist 115 bearing baseplate 116 is moved closer to the actuator assembly 111. With reference to FIG. 2 it may be seen that such an articulated action moves the baseplate 116 closer to the pedestals 120. In order to collect nests 800 bearing containers 900 from the pedestals 120, baseplate 116 may be fitted with a fork 117 disposed for engaging with the nests bearing the containers, as shown in FIG. 4. To the extent that different nests 800 of differing sizes and shapes may be employed, baseplate 116 may be fitted with different forks 117 to match the different nests 800. Baseplate 116 may also be fitted with at least one pusher 118, four pushers being shown in FIG. 3. The purpose and function of pushers 118 will become clear at the hand of FIG. 4.

Different detailed embodiments are possible for the upper arms and forearms of robotic articulated arm subsystem 110. In FIG. 3 rotary elbow 112c is shown as greater in vertical extent than rotary elbow 112d, such that forearms 113c and 113d are not articulating in the same horizontal plane, as is evident from the arrangement of rotary wrist 115. In other embodiments, the rotary elbows may be identical and the forearms 113c and 113d articulate differently at rotary wrist 115. In one embodiment, with the baseplate 116 and fork 117 in the orientation shown in FIG. 3, the empty fork 117 can pass under the forearms 113c and 113d and over the rotary shoulders 112a and 112b in order to reach the pedestals 120 shown in FIG. 2 and FIG. 4.

In FIG. 4, fork 117 is shown depositing through portal 230 nest 800 bearing containers 900 on shelf 210 of lyophilizer subsystem 200. To facilitate this action, lyophilizer door 220 is in the open position. Door 220 is capable of being sealed. As may be seen in FIG. 4, the vertical level of pedestal 120 is comparable to that of the shelf 210 of the lyophilizer 200 being supplied with nests 800. This arrangement facilitates baseplate 116 and its attached pushers 118 and fork 117 in passing between the rotary elbows 112d and 112c (partly obscured behind 112d in FIG. 4) in order to collect further nests of containers from the pedestal 120. FIG. 4 shows further shelves within lyophilizer subsystem 200. Robotic arm subsystem 110 is therefore employed in a first orientation in placing nests 800 at a first location in lyophilizer subsystem 200 and then subsequently employed in a second orientation to move nests 800 to a second location in lyophilizer subsystem 200. In order to vertically stack shelves 210, shelves 210 may be mounted on an elevator system that moves them upward once loaded with container nests.

Once a container bearing nest 800, or row of container bearing nests 800, has been placed on shelf 210, and fork 117 withdrawn from the nest(s) 800, baseplate 116 may be rotated through 180 degrees so that pusher(s) 118 face(s) the nest(s) 800. Actuator assembly 111 may then be operated to push nest(s) 800 further onto the shelf to predetermined or desired positions by means of pushers(s) 118, thereby creating room for another nest 800 or row of nests 800 on shelf 210. When a shelf 210 has been filled to a desired degree with nests 800, the shelf 210 may be raised using the elevator system of the lyophilizer 200.

Returning now to FIG. 1, pharmaceutical container filling subsystem 400 may be, for example, of the type described in detail in U.S. patent application Ser. Nos. 12/393,183 and 13/744,408, both titled "Robotic filling systems and methods", the specifications of which are incorporated herewith in full. This general kind of system is also described in U.S. patent application Ser. No. 14/377,696, titled "Articulated arm apparatus and system", the specification of which is also incorporated herewith in full. Pharmaceutical containers 900 may be filled with a pharmaceutical substance in filling subsystem 400 while borne in nests 800. Nests 800 suitable for use with the present invention include, but are not limited to, those described in WIPO patent application WO2015/023924(A2), titled "Method, device and system for filling pharmaceutical containers" and in WIPO patent application WO2013/166379(A1) titled "Cover removal system for use in controlled environment enclosures," both specifications of which are incorporated herewith in full.

Accumulator subsystem 300 may comprise a robotic arm (not shown) for obtaining nests 800 with filled containers 900 from filling subsystem 400 and for storage of such nests 800 of containers 900 in accumulator subsystem 300. The arm, or another similar articulated robotic arm may be employed to place a nest 800 bearing containers 900 at the source location in tunnel 600.

The embodiment shown in FIG. 1 to FIG. 4 allows for containers nests 800 to be batch transferred to lyophilizer subsystem 200 while other container nests 800 are at the same time being serially transferred from the accumulator subsystem 300 to lyophilizer loader subsystem 100, and yet further container nests 800 are at the same time having their containers 900 filled in filling subsystem 400.

Figure 5:
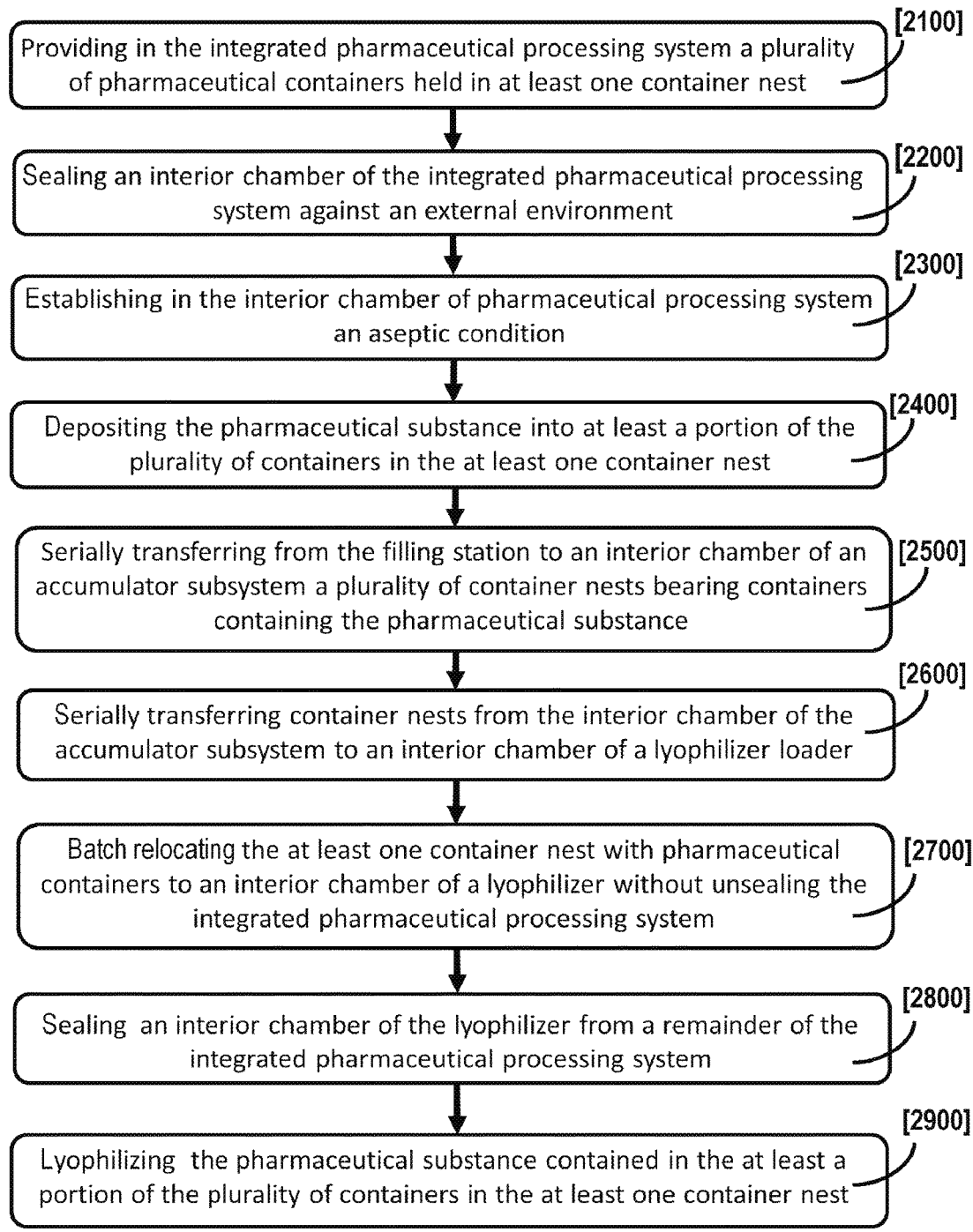
FIG. 5 is a first flow chart for a method for loading pharmaceutical containers into a lyophilizer.

In a further aspect, described at the hand of the flow chart of FIG. 5, a method is presented for lyophilizing a pharmaceutical substance in an integrated pharmaceutical processing system, the method comprising: providing [2100] in the integrated pharmaceutical processing system 1000 a plurality of pharmaceutical containers 900 held in a plurality of container nests 800; sealing [2200] an interior chamber of the integrated pharmaceutical processing system 1000 against an external environment; establishing [2300] in the interior chamber of the pharmaceutical processing system 1000 an aseptic condition; at a filling station within the interior chamber of the processing system 1000 depositing [2400] the pharmaceutical substance into at least a portion of the plurality of containers 900 in the at least one container nest 800; batch relocating [2700] the plurality of container nests 800 with pharmaceutical containers 900 to an interior chamber of a lyophilizer 200 without unsealing the integrated pharmaceutical processing system 1000; sealing [2800] an interior chamber of the lyophilizer 200 from a remainder of the integrated pharmaceutical processing system 1000; and lyophilizing [2900] the pharmaceutical substance contained in the at least a portion of the plurality of containers 900 in the at least one container nest 800.

The method may further comprise serially transferring [2500] within the processing system 1000 from the filling station to an interior chamber of an accumulator subsystem 300 a plurality of container nests 800 bearing containers 900 containing the pharmaceutical substance; and serially transferring [2600] within the interior chamber of the processing system 1000 the at least one container nest 800 from the interior chamber of the accumulator subsystem 300 to a nest access location 120 in an interior chamber of a lyophilizer loading subsystem 100, wherein the at least one container nest 800 is at least one of the plurality of container nests.

The batch relocating may comprise operating a first articulated robotic arm 110 to engage with the plurality of container nests 800; and operating the first articulated robotic arm 110 to place the plurality of container nests 800 at a first location in the interior chamber of the lyophilizer 200. The batch relocating [2700] may further comprise operating the first articulated robotic arm 110 to move the plurality of nests 800 from the first location in the interior chamber of the lyophilizer 200 to a second location in the interior chamber of the lyophilizer 200.

The batch relocating [2700] may comprise operating an articulated robotic arm 110 to engage with the container nests 800 at the nest access location 120; and operating the first articulated robotic arm 110 to place the container nests 800 at a first location in the interior chamber of the lyophilizer 200. The method may further comprise operating the first articulated robotic arm 110 to move the container nests 800 from the first location in the interior chamber of the lyophilizer 200 to a second location in the interior chamber of the lyophilizer 200.

Figure 6:
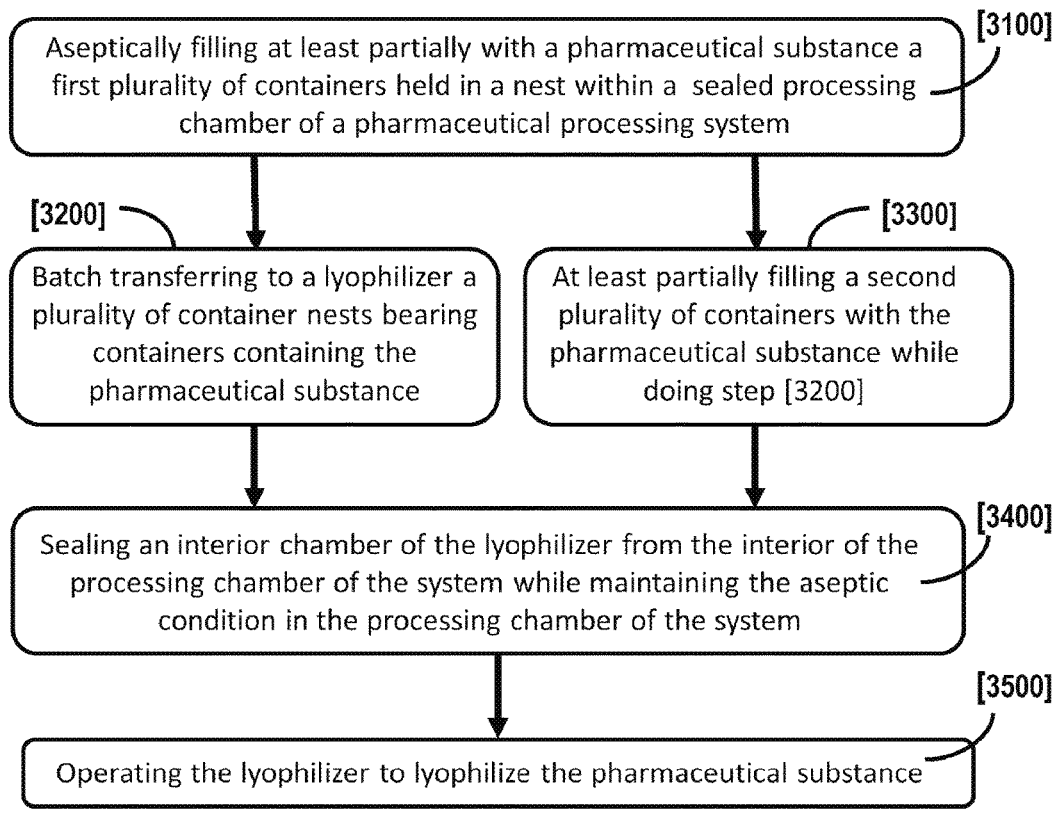
FIG. 6 is a second flow chart for a method for loading pharmaceutical containers into a lyophilizer.

In a further aspect, described at the hand of the flow chart in FIG. 6, a method for lyophilizing a pharmaceutical substance comprises at least partially filling [3100] under an aseptic condition within a sealed processing chamber, for example the interior chamber of system 1000, a first plurality of containers 900 with the pharmaceutical substance while the first plurality of containers 900 is held in a container nest 800; batch transferring [3200] to a lyophilizer 200 a plurality of container nests 800 bearing containers 900 containing the pharmaceutical substance; and operating [3500] the lyophilizer 200 to lyophilize the pharmaceutical substance, wherein the plurality of container nests 800 comprises the at least one container nest containing the at least partially filled first plurality of containers 900. The batch transferring to a lyophilizer 200 a plurality of container nests 800 may be undertaken under the aseptic condition.

The method may further comprise at least partially filling [3300] a second plurality of containers with the pharmaceutical substance while batch transferring [3200] to the lyophilizer the plurality of container nests. The method may further comprise sealing [3400] an interior chamber of the lyophilizer 200 from the interior of the processing chamber of the system 1000 while maintaining the aseptic condition in the processing chamber of the system 1000. The batch transferring [3200] may comprise operating an articulated robotic arm 110 to engage with the plurality of container nests 800; and operating the articulated robotic arm 110 to transfer the container nests 800 to a first location in the lyophilizer 200. The method may further comprise operating the articulated robotic arm 110 to move the container nests 800 from the first location in the lyophilizer 200 to a second location in the lyophilizer 200.

The arm actuators, doors, and other controllable parts of the system are preferably controlled by a control system. This control system can be implemented in connection with special-purpose software programs running on general-purpose computer platforms or application-specific controller platforms, but it could also be implemented in a variety of other ways including through the use of special-purpose hardware for some or all of the control system. And while the system can be broken into the series of modules and steps shown for illustration purposes, one of ordinary skill in the art would recognize that it is also possible to combine them and/or split them differently to achieve a different breakdown, and that the functions of such modules and steps can be arbitrarily distributed and intermingled within different entities, such as routines, files, and/or machines. Moreover, different providers can develop and even operate different parts of the system.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An integrated pharmaceutical processing system, comprising:
   an actuator assembly including:
      a housing having first and second shaft openings;
      at least one rotary actuator held in the housing;
      a first output shaft that passes through the first shaft opening in the housing, has a first end responsive to the at least one rotary actuator inside the housing, and has a second end outside the housing;
      a second output shaft located proximate the first output shaft, wherein the second output shaft passes through the second shaft opening in the housing, has a first end responsive to the at least one rotary actuator inside the housing, and has a second end outside the housing;
   a first upper arm having a first end connected to the second end of the first output shaft and a having a second end so that it is at least generally perpendicular to an axis of rotation of the first output shaft;
   a second upper arm having a first end connected to the second end of the second output shaft and having a second end so that it is at least generally perpendicular to an axis of rotation of the second output shaft;
   a first forearm having a first end and a second end;
   a second forearm having a first end and a second end;
   a first articulation between the second end of the first upper arm and the first end of the first forearm;
   a second articulation between the second end of the second upper arm and the first end of the second forearm;
   a wrist member including:
      an articulation mount having an axis of rotation;
      at least one nest support structure to support a multi-container nest on one side of the axis of rotation of the articulation mount;
      a pushing surface located opposite the axis of rotation of the articulation mount from the nest support structure and is at least generally parallel to the axis of rotation of the articulation mount;
      a third articulation between the second end of the first forearm and the second end of the second forearm, wherein the axes of rotation of the first and second output shafts, and the axes of the first, second, and third articulations are at least generally parallel, and
      a rotary wrist actuator between the third articulation and the wrist member articulation mount.

2. The apparatus of claim 1 wherein the housing, housing openings, wrist actuator, and the first, second, and third articulations are all sealed.

3. The apparatus of claim 1 wherein the nest support structure is a multi-nest support mechanism of support structures that are each constructed to support one of a plurality of multi-container nests.

4. The apparatus of claim 1 wherein the integrated pharmaceutical processing system is a lyophilizer loading system.

5. The apparatus of claim 1 wherein the first and second forearms are offset with respect to each other in the direction of the axes of rotation to allow them to pass next to each other and above the first and second output shafts.

6. The apparatus of claim 1 further including a lifting actuator operatively connected to the first and second output shafts to lift the nests during transfers.

* * * * *